Figure 1:
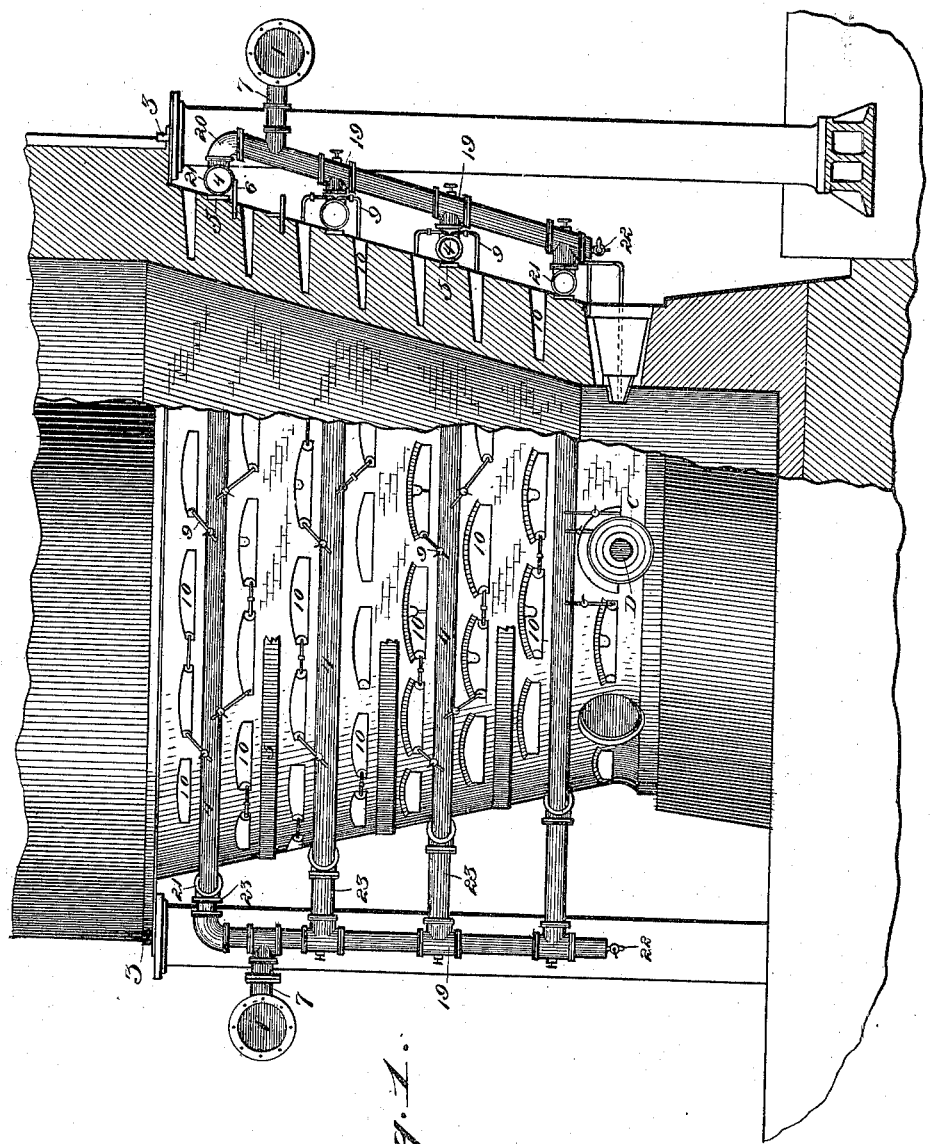

(No Model.) 2 Sheets—Sheet 1.

H. G. BAUMAN.
MANIFOLD WATER SUPPLY FOR BLAST FURNACE BOSH PLATES.

No. 584,763. Patented June 15, 1897.

WITNESSES:
J. P. Appleman
A. M. Wilson

INVENTOR
H. G. Bauman
BY
Henry C. Evert,
ATTORNEY (No Model.) 2 Sheets—Sheet 2.
H. G. BAUMAN.
MANIFOLD WATER SUPPLY FOR BLAST FURNACE BOSH PLATES.
No. 584,763. Patented June 15, 1897.
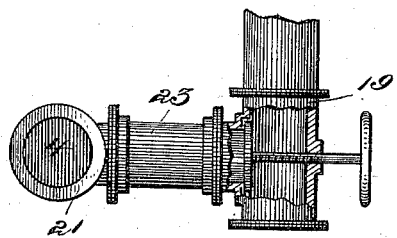
Fig. 5.
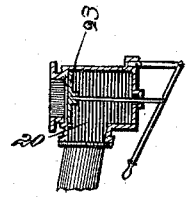
Fig. 6.
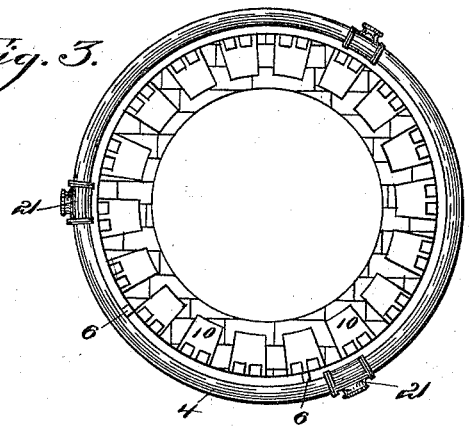
Fig. 3.
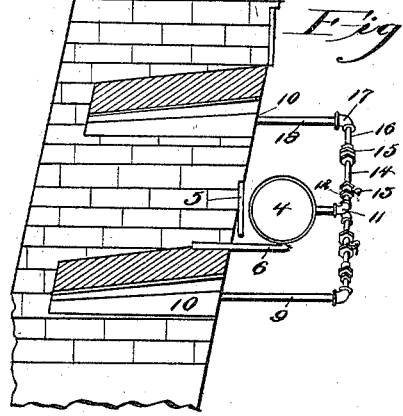
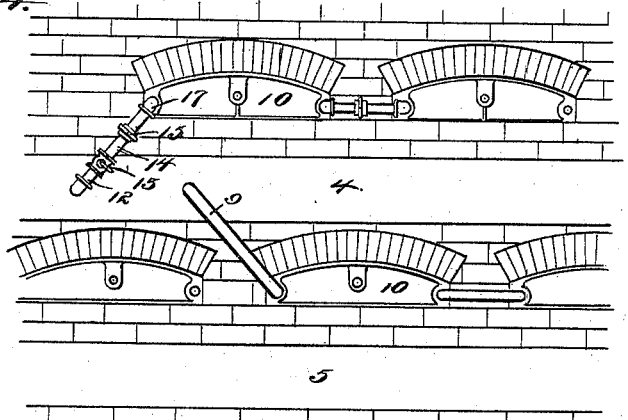
Fig. 4.
Fig. 2.
WITNESSES:
INVENTOR
H. G. Bauman
BY Henry C. Evert
ATTORNEY.

UNITED STATES PATENT OFFICE.

HENRY G. BAUMAN, OF PITTSBURG, PENNSYLVANIA.

MANIFOLD WATER-SUPPLY FOR BLAST-FURNACE BOSH-PLATES.

SPECIFICATION forming part of Letters Patent No. 584,763, dated June 15, 1897.

Application filed February 26, 1897. Serial No. 625,157. (No model.)

*To all whom it may concern:*

Be it known that I, HENRY G. BAUMAN, a citizen of the United States of America, residing at Pittsburg, in the county of Allegheny and State of Pennsylvania, have invented certain new and useful Improvements in a Manifold Water-Supply for Blast-Furnace Bosh-Plates, of which the following is a specification, reference being had therein to the accompanying drawings.

This invention relates to certain new and useful improvements in water-supply to blast-furnace bosh-plates and coolers, and has for its object to provide a manifold supply of water whereby the time required to run water-supply pipes to blast-furnace bosh-plates and coolers and the like is reduced to at least one-half of that now required, and also to reduce the number of feet of small supply-pipe required for this purpose under the ordinary construction to at least one-third of the amount now required.

A further object of my invention is to connect all small supply-pipes in such a manner that they will not cross other plates or necessitate detaching in order to remove a leaky or broken bosh-plate from the furnace and to further connect all these small supply-pipes so that any part of the brickwork in the bosh can be replaced without removing the pipe or running temporary hose-supplies around the break.

A still further object of my invention is to take a supply of water through a main coil almost to the inlet-plates and thus reduce the friction at least eighty per cent. through the reduction of the length of the small pipes to twelve inches or less in length, which under the ordinary construction are in many cases ten to twelve feet in length, and in my improved construction these small pipes are placed at an angle so that they will not become broken or otherwise injured by the expansion, contraction, or sinking of the brick wall of the bosh.

Many objections are encountered in the present manner of construction, among which may be mentioned, first, the time required to run the small pipe; second, the great amount of friction on account of so many small branches from main supply-pipe to plates and coolers; third, the necessity of removing from three to six supplies and running temporary hose connections around a broken or leaky plate before it can be removed; fourth, the great number of small pipes extending upward and downward, which must be removed before the repairs can be made to the bosh, and, as set forth in the objects of my invention, it is my aim to obviate all these objections, my invention further residing in the novel construction, combination, and arrangement of parts, to be hereinafter more specifically described, and particularly pointed out in the claims.

In describing the invention in detail reference is had to the accompanying drawings, forming a part of this specification, and wherein like figures and letters of reference indicate similar parts throughout the several views, in which—

Figure 1 is a side elevation of a furnace, partly broken away, showing my improved system of manifold water-supply in position. Fig. 2 is a side elevation of a portion of a blast-furnace, said view being taken within the lines A B of Fig. 1 to show the connections of the small pipe. Fig. 3 is a sectional view, partly broken away, showing a portion of one of the coils and connections therewith. Fig. 4 is a detail view of the connections with the coils, showing a portion of the furnace-wall. Figs. 5 and 6 are detail views, partly broken away and partly in section, to show connections of the supply with the annular pipes.

Referring now to the drawings by reference figures and letters, the main supply-pipe 1 is shown on the outside of the column, and while it has commonly been the practice to place it between the columns and the bosh I do not wish to be understood as claiming it as new to place it where shown. It should also be understood that this pipe 1 is not limited to the space shown, but may be changed to suit the plans of the skilled engineers while erecting a blast-furnace.

The manifolds 2 may be placed at an angle with the bosh, as is shown to the right of Fig. 1, or the same may be placed in a vertical position, as is shown to the left of Fig. 1. Suitable connection is also made from these manifolds to the main supply-pipe 1.

I do not wish to limit myself to the number of manifolds shown, for as many of these may be used as may be necessary to meet the requirements of the constructing engineer. The auxiliary or supplementary annular pipe 4, previously mentioned, may be made of cast-iron, copper, wrought-iron, steel, or other suitable material, although wrought-iron or steel are the preferred materials. This auxiliary or supplementary annular pipe 4 is placed in the center of the bands 5 and is supported by the band-brackets 6, said annular pipe 4 being so arranged that each coil will supply the row of plates directly above and below the annular pipe. With this arrangement it is only necessary to have a coil on every other band. Where a bosh is jacketed, the coils are placed on brackets directly between the center of the two rows of plates which it is desired to feed. The lower annular pipe 4 or the annular pipe nearest the coolers C supplies all the coolers and twyers D, as well as all plates which may be placed below the bottom annular pipe. The main supply annular pipe, which is provided with outlets 7 7, connecting with the manifolds 2, the water being thus permitted to pass to the inlets 8 in auxiliary or supplementary annular pipe 4, and the small supply-pipes 9 are run from the center of the annular pipe 4 to the plates 10. The small supply-pipes are connected by means of a service-L 11, screwed or otherwise fastened on the annular pipe 4 by a nipple 12, a three-way stop-cock 13, a nipple 14, a union 15, a nipple 16, an L 17, and a nipple 18, to the plate 10. These small supply-pipes described above are not, as will be noticed, placed directly under the plate, which could readily be done on account of the liability of the wall burning out, which would break or rupture the supply and place an undue strain or weight on the annular pipe 4. By arranging these small supply-pipes as shown they are also in a better position to resist the contraction or expansion of the furnace-bosh or the burning out or sinking of the brickwork under the plates. The manifold T's 19 and the L 20 are shown in Fig. 6 provided with a temporary valve on account of the space between the T's 19 and 21, where a regular valve cannot be used. This arrangement I do not claim as new and is only intended for the purpose described.

The stop-cocks 22 in the bottom of the manifolds 2 are provided for the purpose of blowing out and keeping these manifolds clear of sediment, which would otherwise be carried into the plates 10.

From the illustration of the construction that I have shown in the drawings and from the foregoing description it is thought that the operation of the same will be readily apparent and that a further detailed description would be superfluous.

The advantages of the invention will be readily observed and appreciated by those skilled in the art, as the great reduction in labor, material, and expense, as well as the decrease in friction, the saving of pumping machinery, and better and larger supply which is taken almost to the inlet of the plate, and further advantages which have been set forth in the description will make it acceptable to all who attend to the water-supply or manage a blast-furnace. It will also be noted that various changes may be made in the details of construction without departing from the general spirit of my invention.

Having fully described my invention, what I claim as new, and desire to secure by Letters Patent, is—

1. In a manifold water-supply to bosh-plates, a main supply-pipe, the manifold connection therewith, annular pipes, connections from the manifold to the annular pipes, and connections from the annular pipes to the bosh-plates above and below said annular pipes, substantially as shown and described.

2. In a manifold water-supply to bosh-plates, a main supply-pipe, annular pipes, a band surrounding the furnace-bosh, said annular pipes secured to the band, manifold supply-pipes connecting said main supply and annular pipes and connections from annular pipes to the bosh-plates, above and below said annular pipes, substantially as shown and described.

In testimony whereof I affix my signature in presence of two witnesses.

HENRY G. BAUMAN.

Witnesses:
A. M. WILSON,
GEO. B. PARKER.